United States Patent
Gruber et al.

(10) Patent No.: US 9,387,617 B2
(45) Date of Patent: Jul. 12, 2016

(54) METHOD FOR CONTROLLING AN INJECTION PROCESS IN AN OPEN-LOOP OR CLOSED-LOOP MANNER

(75) Inventors: Juan Gruber, Kreuzlingen (CH); Max P. Waser, Hittnau (CH)

(73) Assignee: KISTLER HOLDING AG, Winterthur (CH)

( * ) Notice: Subject to any disclaimer, the term of this patent is extended or adjusted under 35 U.S.C. 154(b) by 390 days.

(21) Appl. No.: 13/499,405

(22) PCT Filed: Oct. 8, 2010

(86) PCT No.: PCT/CH2010/000248
§ 371 (c)(1),
(2), (4) Date: Mar. 30, 2012

(87) PCT Pub. No.: WO2011/044705
PCT Pub. Date: Apr. 21, 2011

(65) Prior Publication Data
US 2012/0187592 A1   Jul. 26, 2012

(30) Foreign Application Priority Data

Oct. 12, 2009 (CH) .......... 1575/09
Nov. 11, 2009 (CH) .......... 1739/09

(51) Int. Cl.
*B29C 45/00* (2006.01)
*B29C 45/76* (2006.01)
(Continued)

(52) U.S. Cl.
CPC .......... *B29C 45/762* (2013.01); *B29C 45/16* (2013.01); *B29C 45/1706* (2013.01);
(Continued)

(58) Field of Classification Search
CPC .......... B29C 45/76; B29C 45/762; B29C 2045/1787; B29C 45/7613; B29C 45/77
USPC .......... 264/40.1, 328.8, 328.1
See application file for complete search history.

(56) References Cited

U.S. PATENT DOCUMENTS

| 3,969,055 A * | 7/1976 | Buckethal .......... 425/145 |
| 4,568,508 A * | 2/1986 | Diekmann .......... B29D 35/082 264/328.8 |
| 2009/0179350 A1 * | 7/2009 | Bader et al. .......... 264/328.8 |

FOREIGN PATENT DOCUMENTS

| AT | 328173 B | 3/1976 |
| CH | 667843 A5 | 11/1988 |

(Continued)

OTHER PUBLICATIONS

English Translation of International Preliminary Report on Patentability, issued May 10, 2012.
(Continued)

*Primary Examiner* — Galen Hauth
(74) *Attorney, Agent, or Firm* — Dority & Manning, P.A.

(57) ABSTRACT

A method for controlling an injection process in an open-loop or closed-loop manner in the production of a molded part injects melt mass by at least one injection unit into at least one cavity enclosed by a tool by means of at least one nozzle. The at least one cavity has at least one measuring location, which is coupled to a binary detector, which can change from a first defined state to a second defined state. The binary detector changes the state thereof at the time at which the melt mass arrives at the measuring location. On the basis of the state change of the binary detector, an open-loop or closed-loop control unit controls the injection velocity V of the at least one injection unit in an open-loop or closed-loop manner, the temperature T of the melt mass before the injection, the termination of the injection at the at least one nozzle, and/or the starting of a subsequent process.

14 Claims, 5 Drawing Sheets

(51) Int. Cl.
 *B29C 45/16* (2006.01)
 *B29C 45/17* (2006.01)
 *B29C 45/56* (2006.01)
 *B29C 45/77* (2006.01)

(52) U.S. Cl.
 CPC ...... *B29C 45/561* (2013.01); *B29C 2045/1707* (2013.01); *B29C 2045/776* (2013.01); *B29C 2945/7601* (2013.01); *B29C 2945/7626* (2013.01); *B29C 2945/76043* (2013.01); *B29C 2945/76454* (2013.01); *B29C 2945/76458* (2013.01); *B29C 2945/76461* (2013.01); *B29C 2945/76478* (2013.01); *B29C 2945/76839* (2013.01); *B29C 2945/76882* (2013.01); *B29C 2945/76889* (2013.01)

(56) References Cited

FOREIGN PATENT DOCUMENTS

| | | |
|---|---|---|
| DE | 2358911 A1 | 6/1974 |
| DE | 102006020037 A1 | 11/2005 |
| JP | 63239011 A | 10/1988 |
| WO | WO 02081177 A1 | 10/2002 |
| WO | WO 2006000411 A1 | 1/2006 |
| WO | WO 2010017940 A1 | 2/2010 |

OTHER PUBLICATIONS

International Search Report on Patentability, issued Sep. 2, 2011.

* cited by examiner

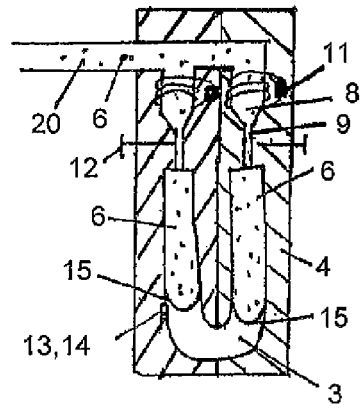
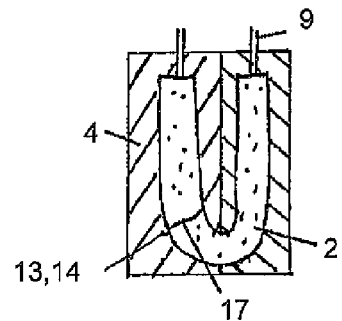
Fig. 6a    Fig. 6b
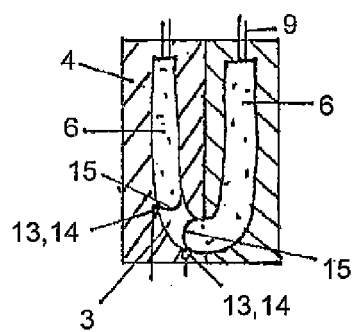
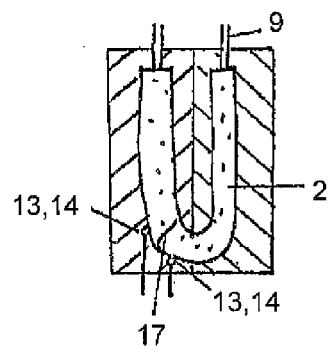
Fig. 7a    Fig. 7b
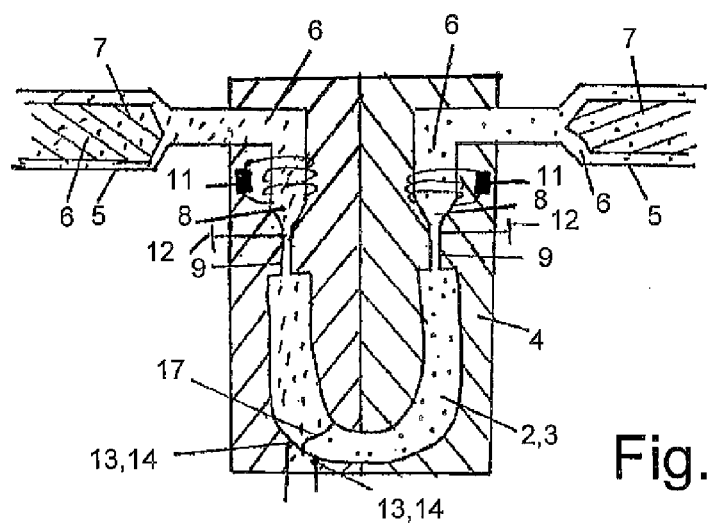
Fig. 8

METHOD FOR CONTROLLING AN INJECTION PROCESS IN AN OPEN-LOOP OR CLOSED-LOOP MANNER

CROSS-REFERENCE TO RELATED APPLICATIONS

This application claims priority to International Application Serial No. PCT/CH2010/000248 filed Sep. 8, 2010, which claims priority to Swiss Application No. CH 1575/09 filed Sep. 12, 2009, and Swiss Application No. CH1739/09, filed on Nov. 11, 2009.

FIELD OF THE INVENTION

The invention relates to a method for controlling an injection process in an open-loop or closed-loop manner in the production of a moulded part, wherein melt mass is injected by at least one injection unit into at least one cavity enclosed by a tool by means of at least one nozzle.

BACKGROUND

Open-loop controls and closed-loop controls in injection moulding processes as a rule comprise the injection phase, during which a cavity in a tool is filled with a melt, the holding phase, which is to offset any material shrinkage, and a following cooling phase, during which the mass finally solidifies into the desired moulded part until the tool is finally opened and the finished moulded part can be removed. In all these phases, open-loop controls and closed-loop controls are necessary which are to ensure that the finished moulded parts are of consistent, reproducible quality.

In another production process, the injection compression, the injection process is followed by a compression process. With the fluid injection technique or the projectile technique, however, moulded parts are produced with cavities. In these production processes, the injection process is followed by a further process step, during which the hot plastic melt is displaced by a fluid.

In all these and further processes, the closed-loop control and open-loop control has to ensure during the injection phase in particular that the cavity is optimally filled. During injection moulding for example it is to be completely filled but not overfilled. If a plurality of cavities is present, this obviously applies to all cavities simultaneously.

The filling quantity in the cavity, as far as that is concerned, depends on the injection velocity of the injection screw and on the temperature of the nozzle prior to the injecting into the cavity. This decisively determines the viscosity of the plastic melt, which has an effect on the flow behaviour. At the correct time, the filling process has to be finally stopped.

In DE 2358911 a method is described, which describes a closed-loop device of injection moulding machines based on pressure and temperature measurements. Based on temperature measurements at different points, the flow front velocity is determined, based on which a control valve is finally set for the next cycle.

From EP 897786 a method for controlling an injection moulding plant is likewise known. This likewise controls different control parameters for the next cycle based on pressure measurements.

All these methods are highly complex and require sensors, which continuously capture measurements, which have to be evaluated and processed.

There are additional methods, during which a pressure or temperature sensor can determine the reaching of a melt front.

In WO 2010/017940 and in JP 63239011 pressure sensors are for example employed for this purpose, in WO 2006/000411, WO 02/081177 and in DE 2358911 one or a plurality of temperature sensors. In AT 328173 the flow front direction is determined with a sensor pair, wherein the sensors supply temperature curves or pressure curves. Here it must be observed that with this method the entire measuring curves have to be captured in each case and interpreted from case to case. During the temperature measurements, triggers must then be set which depend on the tool temperature and on the melting temperature. A temperature sensor can thus be employed as flow front detection sensor only after further adjustments by a trained person. On changing the tool temperature it is necessary to adapt the temperature threshold. Fixed temperature differences can also be preset, which have to be reached during the injection in order to indicate the reaching of the flow front. However, this also includes an interpretation and an evaluation since the received measurements have to be recalculated into a temperature curve and compared with one another before the arriving of the flow front can be indicated. A flow front detection by means of temperature sensors always requires an evaluation and/or adaptation to the tool temperature, which is highly involved.

As pressure sensors, tool interior pressure sensors are possible on the one hand which can be installed in a bore that is open towards the cavity flush with the front of the cavity wall. Since these have a high requirement on the surface conformity so as not to leave any impressions on the casting behind, these are very expensive. On the other hand there are so-called measuring dowels which are arranged set back from the cavity in the tool wall. Such a measuring dowel is clamped in its bore and its measurement signal has to be interpreted and evaluated in a number of pre-tests corresponding to the respective installation positions so that the reaching of the sensor front can be reliably determined. In addition, such measuring dowels are not substantially cheaper than the mentioned tool interior pressure sensors and thus still too expensive.

Both with pressure sensors as well as with temperature sensors, time-dependent measurement curves are always captured and evaluated. This requires not only high-quality sensors but also a sophisticated evaluation software, in which individual settings have to be carried out. This is expensive and complicated.

In CH 667843 an optical lightwave sensor is installed in the cavity surface, wherein on the opposite cavity surface a lightwave receiver is installed in order to determine a presence of the flow front upon absence of the signal. Disadvantageous in this arrangement is that two bores have to be guided into the cavity both of which have to be closed in conformity with the surface. This method is not suitable for transparent materials. In addition, it is far too complicated, unreliable, expensive and complex.

FIG. 2b shows the method according to the prior art: a conventional measuring sensor 21 is arranged in a tool 4 near or directly on the cavity 3. This measuring sensor 21 as a rule is a temperature or pressure sensor. A measurement line 25 connects this measuring sensor 21 with a measurement evaluation and interpretation device 22. The measurement line has to be specially configured depending on the type of measuring element used. In particular, these are thermowire lines, such as NiCr/Ni or corresponding substitute lines when temperature measurements are carried out, or highly insulated lines, when pressure measurements are carried out. Correspondingly, for optical measurements it would have to be light conductors. Since the tool as a rule is surrounded by a tool holder that is not shown, a connector that is not shown is necessary at the transition as a rule. This connector in turn is subject to the same requirements relating to materials or insulation values as the lines 25, which follow said connector. All this makes the measuring device more expensive in addition to the expensive measurement sensor 21. On the measurement evaluation and interpretation device 22, all captured measurements are converted, interpreted and analysed. Measurement signals from temperature signals of thermocouples have to be captured at a compensation point, on which in turn the temperature is measured, and interpreted by means of a table. Following an evaluation, for example after determining a predefined temperature jump or pressure increase, a signal is finally given to an open-loop or closed-loop control unit 10 via a control value line 26, which can now be a conventional copper line. The latter finally controls the further process of the injection moulding operation in an open-loop or closed-loop manner based on the arriving of this signal via line 26 as desired in that it issues an open-loop or closed-loop control command 24. The measurement evaluation and interpretation device 22 and the open-loop or closed-loop control unit can be jointly accommodated in a housing 27 comprising both devices, but which does not constitute any simplification.

BRIEF SUMMARY OF THE INVENTION

The object of the present invention is to state a method described above, which manages without measurement capturing of measurement curves and corresponding evaluation and in particular without expensive and technologically advanced measurement capturing systems that are susceptible to malfunctioning. This serves to render the instrumentation necessary for the control more cost-effective on the one hand and more process-secure on the other hand.

In addition, the method is to be universally applicable, independently of process parameters such as the melt temperature, the tool temperature, the geometry of the cavity in the region of the measuring point and the transparency of the melt. There is to be no need of process-specific settings to be made by the user.

The object is solved through the characteristics described below.

The idea on which the invention is based consists in that at least one cavity comprises a measuring point, which is coupled to a binary switch, also called binary detector. A binary switch or detector is a detector that can change from a first defined state into a second defined state. Here, these states are universal, i.e. independent of process parameters. The binary switch or detector suitably changes its characterising time signal at the time t of the arriving of the melt mass at this measuring point from a first defined signal into a second defined signal and passes said signal directly on to an open-loop or closed-loop control unit. Solely based on the change of this time signal the method controls the injection velocity V of at least one injection unit, the termination of the injection on at least one nozzle, the temperature T of the melt mass before the injection and/or starts a subsequent process in an open-loop or closed-loop manner. Such a subsequent process can for example be the starting of a further injection unit and/or the opening of a further nozzle.

In that in the method according to the invention merely the time t of the arriving of the melt has to be captured, cheap components can be used as binary detectors. In contrast with the methods according to the prior art, no time-dependent measuring curves are recorded, interpreted and evaluated here. In particular, no trigger values have to be set. The use of such a digital detector is in particular independent of temperature values of tool and melt and independent of the geometrical conditions of the cavity in the proximity of the measuring point and independent of further process-specific parameters. It therefore does not require any qualified person for setting specific values.

BRIEF DESCRIPTION OF THE DRAWINGS

In the following, the invention is explained in more detail with the inclusion of the drawings. It shows FIG. 1 a schematic representation of a system according to the invention with a cavity and a nozzle;

FIG. 6 a schematic representation of a system according to the invention with a hot channel and a plurality of nozzles to a cavity each, in which a moulding with a joint line is created, with a measuring point at the joint line, (a) in the unfinished and (b) in the finished state of the moulding;

FIG. 7 a schematic representation according to FIG. 6, with two measuring points at the joint line, (a) in the unfinished and (b) in the finished state of the moulding;

FIG. 8 a schematic representation of a system according to the invention with two injection units with different masses to a cavity having a moulding with a joint line;

DESCRIPTION OF EXEMPLARY EMBODIMENTS OF THE INVENTION

Figure 1:
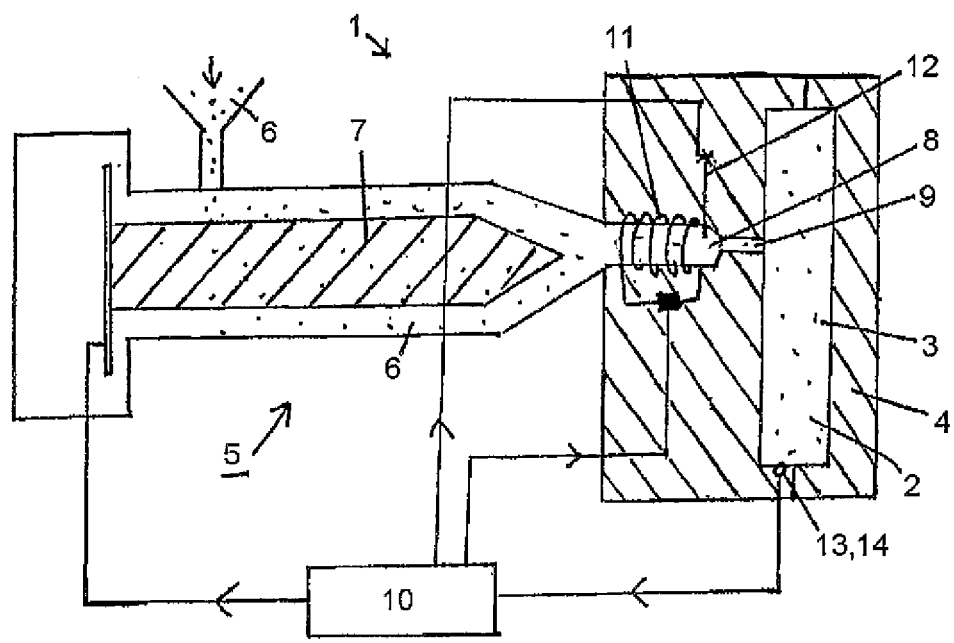

The reference characters were retained in both drawings.

FIG. 1 represents a process system 1 according to the invention for producing a moulding 2 in a cavity 3 that is surrounded by a tool 4. During the production, an injection unit 5 is supplied with melt mass 6, transporting it for example through a screw feed to a nozzle 8, which is connected to the cavity 3 through a channel 9. The melt mass 6 enters the cavity 3 until it is completely filled. An open-loop or closed-loop control 10 now switches the process over to holding pressure.

A heating module 11 in the region of the nozzle 8 can influence the melt in the nozzle 8 and thus change its viscosity. A warmer melt has a lower viscosity and consequently flows more quickly into the cavity 3 than a cooler melt. Thus, the flow velocity can be controlled through the temperature on the nozzle 8. On the other hand, the screw feed velocity is also responsible for the flow velocity. Finally, the system can also have a slide 12 between nozzle 8 and cavity 3, which can terminate the injection in that it is closed.

According to the invention, the process system 1 comprises at least one measuring point 13, which is coupled to a binary detector 14. This detector 14 is configured in such a manner that at the time t of the arriving of the melt front 15 at this measuring point 13, the detector 14 changes its state. Since it is a binary detector, it can only assume two possible states. An open-loop or closed-loop control unit 10 controls the injection on account of such a state change in an open-loop or closed-loop manner. This can in particular effect the change of the injection velocity of the injection unit, the closed-loop control of the temperature of the melt mass 6 before the injection, and/or the termination of the injection after a nozzle 8, for example through a slide 12.

In the present example, the measuring point 13 is preferentially arranged near the point at which the flow path of the melt mass 6 is ended, i.e. at the end of the cavity 3. Thus, on determining the arriving of the melt front 15 the complete filling of the cavity 3 can be inferred, upon which for example the process of the filling phase can be completed and the holding phase initiated.

Figure 10A:
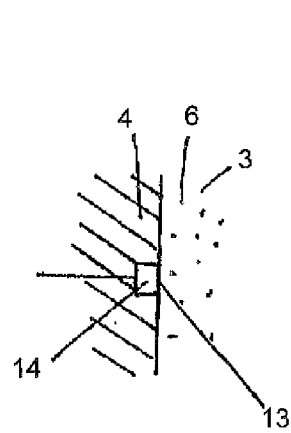
FIG. 10 a part of a tool with a measuring point for capturing the arriving of the melt front, wherein the arriving of the melt front is captured (a) directly on the cavity surface, (b) in the tool wall near the cavity surface, (c) behind an ejector pin or measuring pin.
Figure 10B:
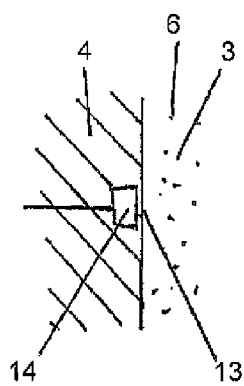
Figure 10C:
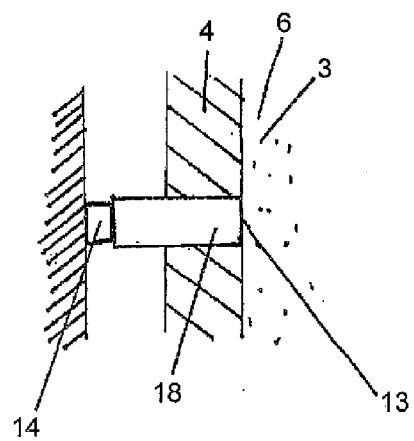

The arriving of the melt front 15 at the measuring point 13 can be captured by the binary detector 14 at different points. In particular, this can be captured by a measuring element 14 adjoining the cavity 3 (FIG. 10(a)) or in the cavity wall 4 near the cavity 3 (FIG. 10(b)). On the other hand, a suitable measuring element 14 can also be attached behind an ejector pin 18 or behind a measuring pin 18 (FIG. 10(c)). Even if the measuring element 14 is arranged distant from the cavity 3, the measuring point 13, i.e. the decisive location at which the melt front 15 has to be passed in order to put the detector 14 into another state, is nevertheless always directly on the cavity wall 4.

Decisive for the detector 14 mentioned here is that unlike as is known from the prior art where a measurement has to be determined, recorded and interpreted over a certain period of time, only the change of the binary detector 14 has to be captured. In contrast with temperature measurements through thermocouples, whereas lines and connections, special thermocouple materials such as nickel-chromium/nickel and/or suitable compensation lines have to be used in order to achieve accurate measurements, conventionally insulated one or two-core copper lines suffice in the present case. The same applies to pressure measurements: for piezoelectric pressure measurements, highly insulated lines and connections with insulation sheaths of at least $10^{12}$ ohm are required in order to be able to keep the interference signals away. However, for the purpose of a detector 14, it must only be possible in principle to distinguish between two states. For this reason, no special requirements in terms of the lines and connections to the pressure measuring elements are necessary for this purpose, simply insulated copper lines, one or two-core, and commercially available connections are totally adequate. The use of a binary detector 14 is therefore fundamentally cheaper and simpler than an evaluation of time-dependent measurement data.

Figure 2A:
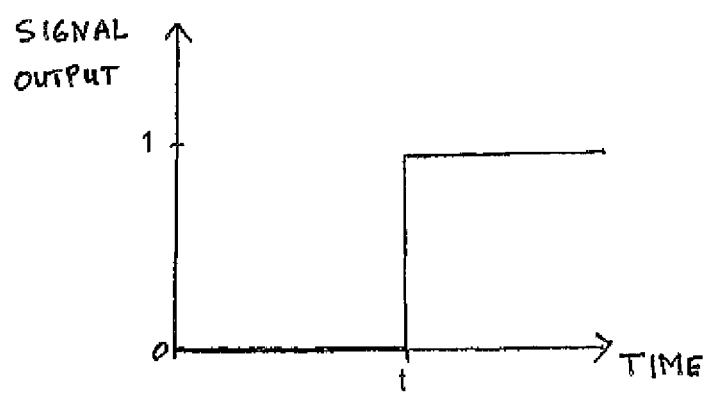
FIG. 2a diagram of a signal output of a detector before and after an event t.
Figure 2B:
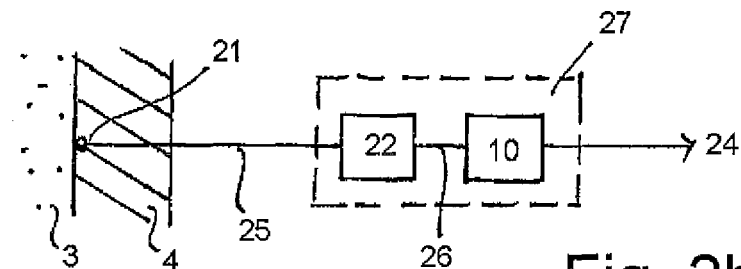
FIG. 2b representation of the method according to the prior art.

FIG. 2a shows the change of the signal at the time t as an example. Here, the output signal changes the detector 14 from 0 to 1.

Figure 2C:
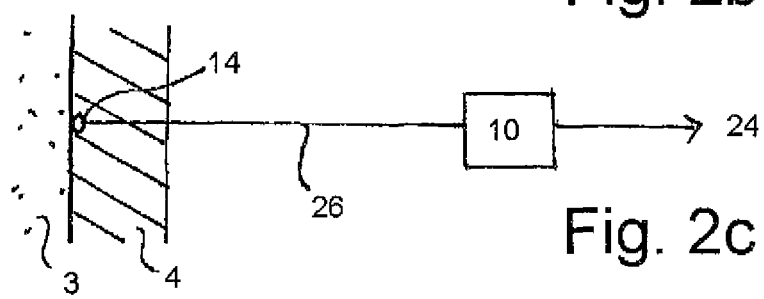
FIG. 2c method according to the invention.

FIG. 2c represents the method according to the invention: the binary detector 14 is arranged near or on the cavity 3 for example in the tool 4, Since it is a detector that can only assume two states, a simply copper line, one or two core, is provided as control value line 26, which connects this detector 14 to the open-loop or closed-loop control unit 10. The latter finally controls the further process of the injection moulding operation based on the arriving of this signal 26 as desired in an open-loop or closed-loop manner in that it issues an open-loop or closed-loop control command 24.

Figure 2D:
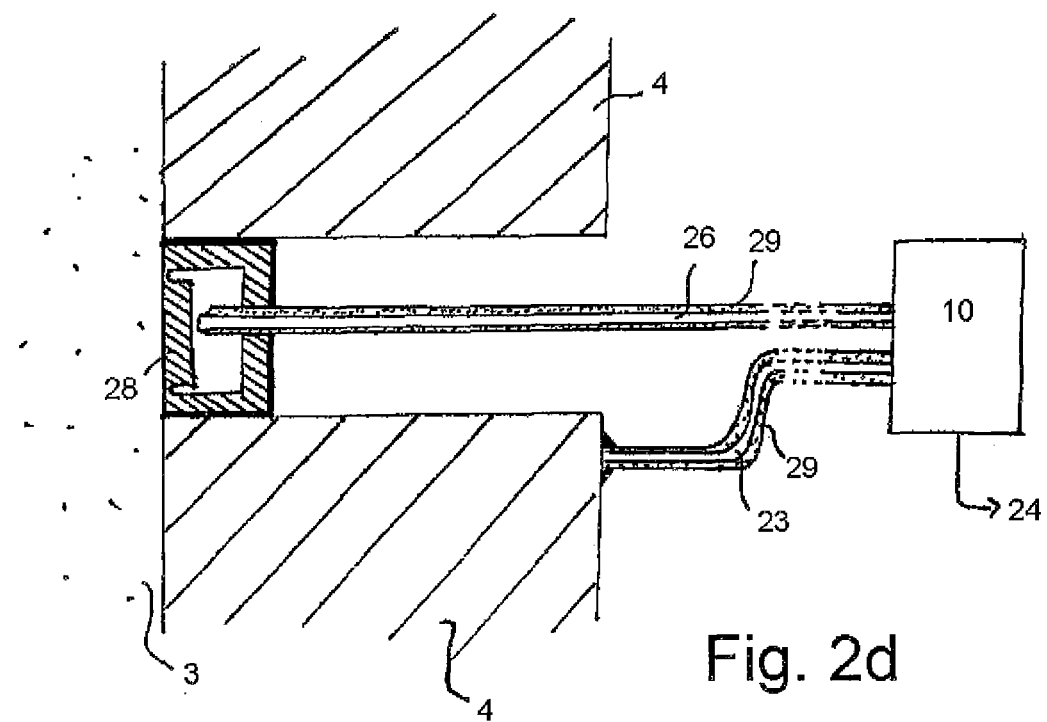
FIG. 2d example of a binary detector or switch.

The binary detector 14 can for example, as shown in FIG. 2d, comprise a front diaphragm 28, which, upon the arriving of the melt front is slightly set back by the melt. Behind this diaphragm 28, a conductor 26 with insulation 29 can be attached after a very small gap spacing, which on arriving of the melt enters into electrical contact with the diaphragm that is then set back and because of this conducts a signal '1' to the open-loop or closed-loop control unit 10. In this case, a single-core control value line 26 within the tool is sufficient, since an electrical circuit can be closed via the diaphragm 28 of the detector 14 and for example via a thread from the detector to the tool 4. Outside the tool, a ground wire 23 finally leads to the open-loop or closed-loop control unit 10. This is an exemplary embodiment, wherein the binary sensor reacts to pressure. However, it differs in principle from a pressure sensor, since it can only assume two states and does not supply any values for the amount of the pressure, in particular no measurement curve. Accordingly, no second step follows either in which a measurement has to be evaluated and interpreted, as this is necessary according to the known methods.

In the open-loop or closed-loop control unit 10 a voltage is applied between the two connections of the control value line 26. For as long as this is maintained, the flow front has not yet arrived. As soon as this voltage drops to zero, the flow front has arrived. The open-loop or closed-loop control unit 10 now issues the open-loop or closed-loop control command 24.

The present invention is not restricted to the exemplary embodiment as binary detector mentioned here. Further binary detectors or switches can be easily described which satisfy the requirements made here. In particular, the binary detector 14 can comprise a measuring element, which captures the time t mechanically, optically, thermally, capacitively, inductively, electromagnetically, electrically or chemically.

A binary detector 14 described here need not necessarily be installed flush to the cavity. If the bore is not continuous as far as to the cavity 3 and only a thin wall to the cavity is present, such a binary detector 14 can also be employed in such a bore. The thin wall finally transmits the pressure onto the diaphragm 28.

Figure 3A:
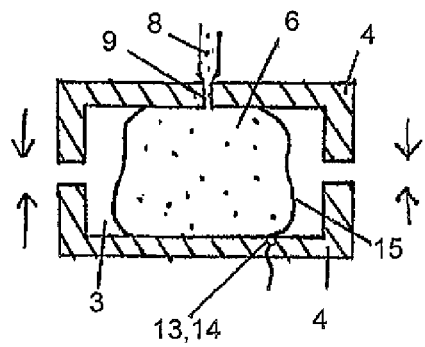
FIG. 3 a schematic representation of a system according to the invention with a nozzle to a cavity, which is subject to a later compression in the (a) open and (b) closed state.
Figure 3B:
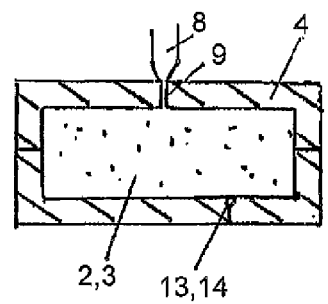

FIG. 3 represents the method of injection compression. With such a method, melt mass 6 is injected into a cavity 3 in a first stage as with injection moulding, however said cavity is not completely filled. FIG. 3a shows an example of a filling state at the end of this first step. In a second step, the two tool halves 4, which surrounds the cavity 3, are finally moved together for a compression process. The melt mass 6 is now distributed throughout the cavity 3, as is shown in FIG. 3b. It is important that on the one hand the filling state after the first step is quite adequate in order to fill the mould in the second step, but is not overfilled on the other hand. To this end, a binary detector 14 can be coupled to a suitable measuring point 13 according to the invention, which detects the optimal filling state. An open-loop or closed-loop control unit interrupts the filling of the cavity 3 at this point t and initiates the closing of the tool halves 4.

Figure 4:
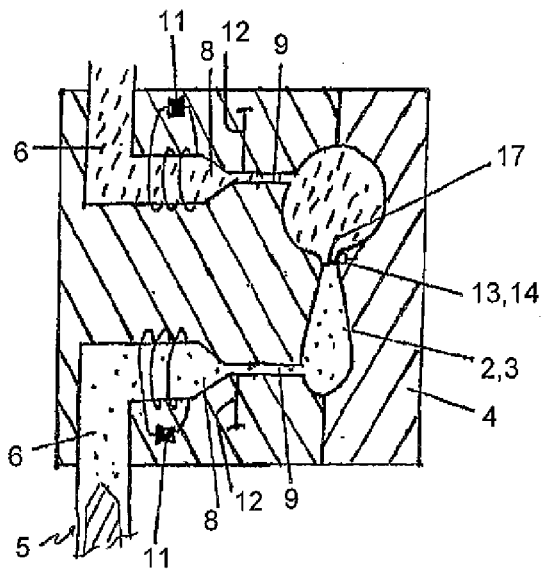
FIG. 4 a schematic representation of a system according to the invention with a cavity and two injection units, which can fill the cavity with different materials.

A further example is stated in FIG. 4, the manufacture of multi-component mouldings 2. Here, too, the injection operation is stopped and subsequently a further method step is started. This method step is the starting of a further injection unit, wherein for example another material or another characteristic, (e.g. colour) of the same material is used as melt mass 6. Again, by determining the melt front 15 by means of a binary detector 14, the optimal filling state and thus the correct time t for stopping the first injection unit 5 and for starting the subsequent process, can be initiated.

Figure 5A:
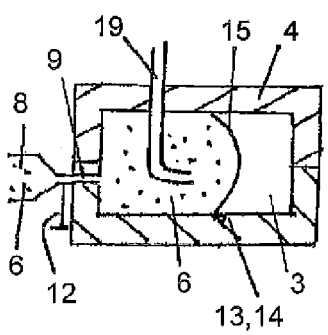
FIG. 5 a schematic representation of a system according to the invention with a cavity and an injection nozzle and with a fluid injection device for fluid injection processes (a) before and (b) after the fluid injection.
Figure 5B:
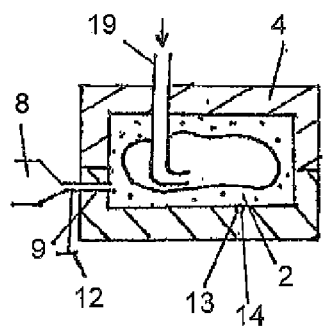

FIG. 5 represents an example of a fluid injection process. In this process, a certain quantity of melt mass 6 is again injected into a cavity 3, as is shown in FIG. 5a. In a following phase, fluid is finally injected into the melt mass 6 through a device for fluid injection 19, as a result of which this melt mass 6 is forced to the edge of the cavity 3. Here, too, the filling state is determined by the binary detector 14.

In FIGS. 6-8, a cavity 3 each is simultaneously filled by at least two nozzles 8. Because of this, a joint line is created in each case at the point at which two flow fronts meet. Such points are firstly mechanically less loadable and secondly optically detectable. In addition, if a plurality of injection units 5 is used, different melt masses 6 can also be used, as shown in FIG. 8. In all these cases, the location of the joint line 17 is to be placed at a predetermined point.

To this end, as shown in FIG. 6, a first measuring point 13 can be equipped with a detector 14 according to the invention. On switching-over the detector 14, the supply of melt mass 6 on the first detector 14 is stopped for example, so that the rest of the cavity 3 is only filled by the second nozzle 8.

In FIG. 7, two measuring points 13 are equipped with detectors 14. Through the second detector 14 it can now be determined, when the cavity 3 is now completely filled by the second nozzle 8. On the other hand it can be achieved through the temperature-controlling of the nozzles 9 and thus through the adjusting of the viscosities of the melt masses 6 in the nozzles 8 that both melt fronts 15 pass the measuring points 13 simultaneously. It is guaranteed, even then, that the joint line 17 is located between the two measuring points 13. Both examples of FIGS. 6 and 7 can obviously be carried out with same or different melt masses 6, i.e. with an injection unit 5 and a hot channel 20 or with two injection units 5. In the case of a plurality of injection units 5, as is represented in FIG. 8, the injection velocities can be controlled in an open-loop or closed-loop manner independently of one another through the binary detector 14.

Figure 9:
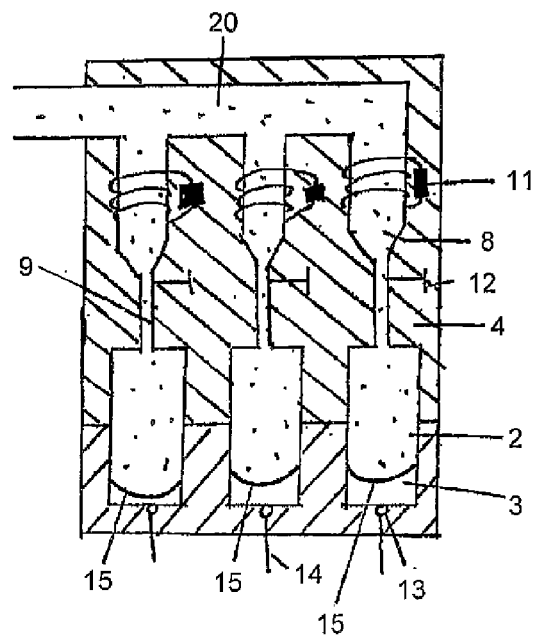
FIG. 9 a schematic representation of a system according to the invention with a hot channel and a plurality of nozzles to the same cavity.

FIG. 9 states a further example of a multi-cavity tool 4. Here, an injection unit 5 injects melt mass 6 into the same number of cavities 3 via a hot channel 20 with a plurality of nozzles 8, wherein at the end of each cavity 3 a measuring point 13 corresponds with a detector 14. By closed-loop control on the nozzles 8 the different viscosities can be set so that all cavities 3 are filled simultaneously.

LIST OF REFERENCE CHARACTERS

1 Process system
2 Moulding, multi-component moulding
3 Cavity
4 Tool, tool half, multi-cavity tool
5 Injection unit
6 Melt mass
7 Screw
8 Nozzle
9 Channel
10 Open-loop or closed-loop control unit
11 Heating module
12 Slide
13 Measuring point
14 Binary detector, switch
15 Melt front
17 Joint line
18 Ejector pin or measuring pin
19 Device for the fluid injection
20 Hot channel
21 Measuring sensor, temperature sensor, pressure sensor
22 Measurement evaluation and interpretation device
23 Ground wire
24 Open-loop or closed-loop control command
25 Measurement line
26 Front detection signal line, digital output
27 Housing
28 Diaphragm
29 Insulation
T Temperature of the melt mass
V Screw feed velocity
t Time of the arriving of the melt

The invention claimed is:

1. A method for controlling an injection process in an open-loop or closed-loop manner during the production of a moulding, wherein melt mass is injected by at least one injection unit into at least one cavity enclosed by a tool by means of at least one nozzle, wherein the at least one cavity comprises at least one measuring point which is coupled to a binary detector, which can only assume two output states, which can change from a first defined output state at an initial sensed condition of a parameter of the injection process into a second defined output state in response to a change of the initial sensed condition of the parameter of the injection process, wherein the binary detector does not form an edge of the cavity wall, wherein when the binary detector is in either the first output state or the second output state, the method comprising the following steps:

sensing an initial sensed condition at the measuring point before the melt mass is injected and when the binary detector is in a first one of its two output states, when at the time t, which denotes the moment when the melt mass arrives at the measuring point, the binary detector senses a change in the initial sensed condition, wherein when the binary detector senses a change in the initial sensed condition then without first converting that sensed change in the initial sensed condition into a numerical representation of the parameter of the injection process, the output state of the binary detector changes to the second one of its two output states at the time t, wherein this change in the output state of the binary detector at the time t occurs without rendering a particular numerical quantification of the magnitude of the melt temperature, a particular numerical quantification of the magnitude of the tool temperature, a particular numerical quantification concerning the geometry of the cavity in the region of the measuring point and without a particular numerical quantification concerning the transparency of the melt, and without setting of any predetermined trigger values in the binary detector and without performing any interpretation of numerically quantified measurements of the binary detector, wherein the change in the output state of the binary detector is transmitted by an unprocessed electric signal via an insulated copper line that extends from the binary detector to an open-loop or closed-loop control unit, and wherein solely based on the change of output state of the binary detector, the open-loop or closed-loop control unit controls in an open loop manner or in a closed loop manner a parameter of the process selected from the following process parameters: the injection velocity V of the at least one injection unit, the temperature T of the melt mass before the injection, the termination of the injection on the at least one nozzle and the starting of a subsequent process.

2. The method according to claim 1, wherein the open-loop or closed-loop control unit controls the stopping of the injection process and the start of a following method step based on the state change of the detector, the method step that is to be started being one of the method steps selected from the following group of method steps: the holding phase, a compression of a compression injection process, the starting of a further injection unit of a production of multi-component moldings, and the start of the fluid injection of a fluid injection process.

3. The method according to claim 1, wherein melt mass is simultaneously injected into the same cavity via two or more nozzles, as a result of which a joint line is created upon the meeting of two melt fronts in each case, wherein the open-loop or closed-loop control unit controls the starting and/or terminating of the injection of at least one nozzle based on the state change of the detector, in order to achieve a predetermined position of the joint line.

4. The method according to claim 1, wherein melt mass is simultaneously injected in the same cavity via two or more nozzles, as a result of which a joint line is created upon the meeting of each two melt fronts, and wherein, coupled to two or more measuring points, two or more binary detectors are attached, which upon passing of the melt fronts at the measuring points change their states, wherein the open-loop or closed-loop control unit controls the temperatures T of the melt masses in the nozzles because of these state changes in order to achieve a predetermined position of the joint line.

5. The method according to claim 4, wherein the temperatures T of the melt masses before the injection are regulated in such a manner that the melt fronts reach the measuring points simultaneously.

6. The method according to claim 1, wherein two or more injection units inject same or different melt masses into at least one nozzle each.

7. The method according to claim 6, wherein the open-loop or closed-loop control unit controls the injection velocity V of the injection units.

8. The method according to claim 1, wherein melt mass is simultaneously injected into two or more cavities via two or more nozzles, wherein each cavity comprises at least one measuring point with a binary detector coupled thereto each, wherein the binary detectors at the times of the arriving of the melt fronts at the respective measuring points change their states, upon which the open-loop or closed-loop control unit terminates the injection on at least one nozzle and/or controls the temperatures T of the melt masses before the injection.

9. The method according to claim 8, wherein the temperatures T of the melt masses are regulated in such a manner that the melt fronts reach all measuring points simultaneously.

10. The method according to claim 1, wherein the binary detector captures a change in the initial sensed condition at the measuring point in a manner selected from the group consisting of: mechanically, thermally, capacitively, inductively, electromagnetically, electrically and chemically.

11. The method according to claim 1, wherein the binary detector captures the arriving of the melt front at the measuring point in the tool at a location selected from the group consisting of: directly adjoining the cavity, in the tool wall near the cavity, behind an ejector pin and behind a measuring pin.

12. The method according to claim 1, wherein at least one measuring point is arranged near a point at which a flow path of the melt mass is to be ended.

13. The method according to claim 1, wherein a control value line connects the binary detector with the open-loop or closed-loop control unit.

14. The method according to claim 1, wherein the binary detector can be employed at a location that except for avoiding being part of the tool edge, is otherwise independent of the geometrical conditions of the cavity in the proximity of the measuring point and wherein except for the increase in temperature or pressure at the denoted time t, the binary detector is employed independently of where within the binary detector's sensing range the precise value of the initial sensed condition of the process parameters lies.

* * * * *